(12) United States Patent
Kirkpatrick

(10) Patent No.: US 10,371,222 B2
(45) Date of Patent: Aug. 6, 2019

(54) NEEDLED BRAKE DISKS AND METHODS

(71) Applicant: Goodrich Corporation, Charlotte, NC (US)

(72) Inventor: Christopher Kirkpatrick, Pueblo West, CO (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 14/979,968

(22) Filed: Dec. 28, 2015

(65) Prior Publication Data
US 2017/0184166 A1 Jun. 29, 2017

(51) Int. Cl.
F16D 65/12 (2006.01)
C04B 35/83 (2006.01)
D04H 18/02 (2012.01)
B32B 5/22 (2006.01)
B32B 7/08 (2019.01)

(52) U.S. Cl.
CPC .............. *F16D 65/126* (2013.01); *B32B 5/22* (2013.01); *B32B 7/08* (2013.01); *C04B 35/83* (2013.01); *D04H 18/02* (2013.01); *F16D 65/125* (2013.01); *C04B 2235/5248* (2013.01); *F16D 2200/0047* (2013.01); *F16D 2200/0052* (2013.01); *F16D 2200/0065* (2013.01); *F16D 2200/0082* (2013.01); *F16D 2250/0023* (2013.01)

(58) Field of Classification Search
CPC ....... F16D 2065/132; F16D 2200/0052; F16D 65/126; F16D 65/125; D04H 1/4242; D04H 1/46; D04H 1/465; D04H 1/48; D04H 1/498; D04H 18/02
See application file for complete search history.

(56) References Cited

U.S. PATENT DOCUMENTS 5,405,560 A * 4/1995 Chareire ................. C04B 35/83
264/29.5
5,908,792 A 6/1999 Sheehan et al.
(Continued)

FOREIGN PATENT DOCUMENTS

CN 103909691 7/2014
FR 2759387 8/1998
(Continued)

OTHER PUBLICATIONS

EP Search Report dated Jul. 25, 2017 in EP Application No. 16205849.9.

Primary Examiner — Nicholas J Lane
(74) Attorney, Agent, or Firm — Snell & Wilmer, L.L.P.

(57) ABSTRACT

The present disclosure provides a fibrous preform, comprising an annulus having at least one of an outer diameter portion or an inner diameter portion, the outer diameter portion extending radially inward from an outer diameter of the fibrous preform and the inner diameter portion extending radially outward from an inner diameter of the fibrous preform. In various embodiments, the fibrous preform further comprises a medial diameter portion disposed between the outer diameter and the inner diameter, wherein the medial diameter portion comprises a first needling profile, and the at least one of the outer diameter portion or the inner diameter portion comprises a second needling profile. In various embodiments, the first needling profile is less than the second needling profile.

5 Claims, 6 Drawing Sheets

(56) References Cited

U.S. PATENT DOCUMENTS

| | | | |
|---|---|---|---|
| 6,405,417 B1* | 6/2002 | Sheehan | G03G 15/657 28/107 |
| 7,520,037 B2 | 4/2009 | Short | |
| 2009/0110877 A1* | 4/2009 | Bernard | B26F 1/26 428/131 |
| 2009/0139808 A1* | 6/2009 | Bouchard | F16D 69/023 188/218 XL |
| 2011/0154629 A1* | 6/2011 | Delecroix | D04H 18/02 28/107 |
| 2012/0131775 A1 | 5/2012 | Delecroix | |
| 2014/0373322 A1* | 12/2014 | Gautier | D04H 1/4242 28/107 |
| 2015/0267329 A1 | 9/2015 | Kirkpatrick | |
| 2016/0102023 A1* | 4/2016 | La Forest | B23K 26/364 428/155 |

FOREIGN PATENT DOCUMENTS

| | | |
|---|---|---|
| WO | 2000050676 | 8/2000 |
| WO | 2005059225 | 6/2005 |

\* cited by examiner

NEEDLED BRAKE DISKS AND METHODS

FIELD OF THE DISCLOSURE

The present disclosure relates to carbon fiber preforms, and more particularly, to optimally needled brake disks and methods of making the same.

BACKGROUND OF THE DISCLOSURE

Carbon/carbon ("C/C") parts are employed in various industries. An exemplary use for C/C parts includes using C/C parts as friction disks such as aircraft brake disks, race car brake disks, clutch disks, and the like. Conventionally, C/C aircraft brakes are manufactured from preforms that have been cut or die punched from a long board of uniformly needled oxidized polyacrylonitrile (PAN) fibers ("OPF") material. Each horizontal layer of the preform is typically laid down and needled continuously across the majority of each surface of the preform. Needling is typically followed by carbonization and densification. Needling of OPF or carbon fiber material may affect certain performance characteristics of C/C parts, including densification, mechanical strength, heat conduction, and friction and wear characteristics.

SUMMARY OF THE DISCLOSURE

In various embodiments, the present disclosure provides a fibrous preform comprising an annulus having at least one of an outer diameter portion or an inner diameter portion, the outer diameter portion extending radially inward from an outer diameter of the fibrous preform and the inner diameter portion extending radially outward from an inner diameter of the fibrous preform. In various embodiments, the fibrous preform further comprises a medial diameter portion disposed between the outer diameter and the inner diameter, wherein the medial diameter portion comprises a first needling profile, and the at least one of the outer diameter portion or the inner diameter portion comprises a second needling profile. In various embodiments, the first needling profile is less than the second needling profile.

In various embodiments, the fibrous preform further comprises a heat affected zone disposed in the medial diameter portion. In various embodiments, the heat affected zone comprises a third needling profile, the third needling profile being less than the first needling profile. In various embodiments, the fibrous preform further comprises an inner portion disposed between a first planar portion and a second planar portion, the first planar portion being disposed adjacent to a first planar face of the fibrous preform and the second planar portion being disposed adjacent to a second planar face of the fibrous preform, wherein the inner portion comprises a fourth needling profile, the fourth needling profile being greater than the first needling profile.

In various embodiments, the present disclosure provides a brake disk, comprising an annular disk having at least one of a rotor lug disposed on an outer diameter of the brake disk or a stator lug disposed on an inner diameter of the brake disk, and at least one of an outer diameter portion extending radially inward from the outer diameter r an inner diameter portion extending radially outward from the inner diameter. In various embodiments, the brake disk further comprises a medial diameter portion disposed between the outer diameter and the inner diameter wherein the medial diameter portion comprises a first needling profile, and the at least one of the outer diameter portion or the inner diameter portion comprises a second needling profile. In various embodiments, the first needling profile is less than the second needling profile.

In various embodiments, the rotor lug comprises the second needling profile. In various embodiments, the brake disk further comprises a heat affected zone disposed in the medial diameter portion. In various embodiments, the heat affected zone comprises a third needling profile, the third needling profile being less than the first needling profile. In various embodiments, the stator lug comprises the second needling profile. In various embodiments, the brake disk further comprises an inner portion disposed between a first planar portion and a second planar portion, the first planar portion being disposed adjacent to a first planar face of the brake disk and the second planar portion being disposed adjacent to a second planar face of the brake disk, wherein the inner portion comprises a fourth needling profile, the fourth needling profile being greater than the first needling profile.

In various embodiments, the present disclosure provides a method comprising determining a first needling profile to optimize a first performance characteristic, determining a second needling profile to optimize a second performance characteristic, and needling a preform to achieve a non-uniform needling profile in the radial direction. In various embodiments, the needling comprises needling a medial portion of a preform to achieve the first needling profile and needling at least one of an inner diameter portion or an outer diameter portion of a preform to achieve the second needling profile.

In various embodiments, the method further comprises determining a third needling profile configured to optimize a third performance characteristic, and the needling further comprises needling a heat affected zone disposed in the medial portion to achieve a third needling profile. In various embodiments, the method further comprises determining a fourth needling profile configured to optimize a fourth performance characteristic, and needling the preform to achieve a non-uniform needling profile in the axial direction. In various embodiments, needling comprises needling an inner portion of the preform to achieve the fourth needling profile.

In various embodiments, the needling is performed on individual layers of the preform. In various embodiments, the needling is performed on each fiber tow length of a plurality of fiber tow lengths of the preform. In various embodiments, each fiber tow length of a plurality of fiber tow lengths comprises a first angle of orientation measured at an inner diameter of the preform, the first angle of orientation being repeated in a circular progression around the inner diameter, and a second angle of orientation measured at an outer diameter of the preform, the second angle of orientation being repeated in a circular progression around an exterior circumference of the preform, wherein adjacent fiber tow lengths of the plurality of fiber tow lengths are each spaced apart at a substantially uniform distance.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft brake disks. However, various aspects of the disclosed embodiments may be adapted for optimized performance with a variety of carbon fiber preforms and C/C brake disks. As such, numerous applications of the present disclosure may be realized.

Figure 1:
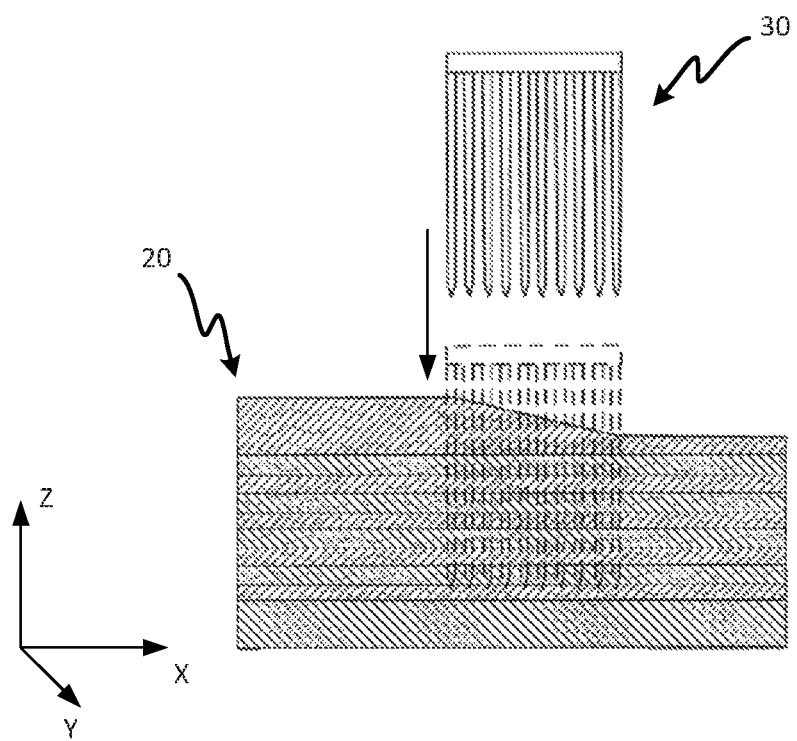
FIG. 1 illustrates a schematic side view of a fibrous preform and barbed needles.

Conventionally, C/C material is generally formed by utilizing OPF fibers. OPF fibers are layered in a selected orientation into a preform of a selected geometry. With reference to FIG. 1, two or more layers of fibers may be layered onto a support and are then needled together simultaneously or in a series of needling steps to create the fibrous preform 20. This process interconnects the horizontal fibers, situated in the x- and y-directions, with a third direction (also called the z-direction). The fibers extending into the third direction are also called z-fibers. This needling process may involve driving a multitude of barbed needles 30 into the fibrous layers to displace a portion of the horizontal fibers into the z-direction. FIG. 1 provides a general understanding of needling a fibrous preform and is not intended to limit the disclosure.

In various embodiments, the needling profile of a fibrous preform may affect performance characteristics of the C/C material produced therefrom. As used herein, "profile" refers to the contour and characteristics of a given property in a specific direction or orientation within a preform. For example, a "needling profile" in a radial direction would refer to the specific quantitative values of the amount of needling at various points along the radial direction. In various embodiments, a needling profile may be uniform, such that the quantitative amount of needling remains substantially equal across the portion of the fibrous preform and/or brake disk referenced. In various embodiments, a needling profile may be non-uniform, such that the quantitative amount of needling is variable across the portion of the fibrous preform and/or brake disk referenced.

In various embodiments, the needling profile may be affected by a variety of factors. In various embodiments, an increase in the number of needle penetrations per unit area in the x-y plane (referred to as needling density) may be understood to increase the needling profile. In various embodiments, an increase in the depth of needle penetration in the z-direction (referred to as needling depth) may be understood to increase the needling profile. In various embodiments, an increase in the diameter of one or more needles may be understood to increase the needling profile. In various embodiments, an increase in the number of needle barbs may be understood to increase the needling profile. In various embodiments, an increase in the quantity of needle barbs may be understood to increase the needling profile.

In various embodiments, a selected performance characteristic of a brake disk may be optimized by application of a determined a needling profile to a fibrous preform. In various embodiments, a first needling profile may be determined to optimize friction and wear of the brake disk, such that a rate of wear is decreased without significant reduction in a friction coefficient of the brake disk. In various embodiments, a second needling profile may be determined to optimize mechanical strength and/or shear strength of a brake disk. In various embodiments, a third needling profile may be determined to optimize friction and wear of the brake disk, such that a rate of wear is increased. In various embodiments, a fourth needling profile may be determined to optimize densification of the brake disk.

In various embodiments, the fibrous preform may comprise one or more needling profiles disposed at various portions of the fibrous preform and/or brake disk. In various embodiments, a needling profile of the brake disk may be non-uniform in the x-y plane and/or in a radial direction. In various embodiments, a needling profile of the brake disk may be non-uniform in the z-direction and/or in an axial direction. In various embodiments, each individual portion of the fibrous preform and/or brake disk may comprise a non-uniform needling profile such that change in the needling profile is gradual as between adjacent portions of the fibrous preform and/or brake disk. In various embodiments, each individual portion of the fibrous preform and/or brake disk may comprise a uniform needling profile such that change in the needling profile is stepped and/or sudden as between adjacent portions of the fibrous preform and/or brake disk.

Figure 2A:
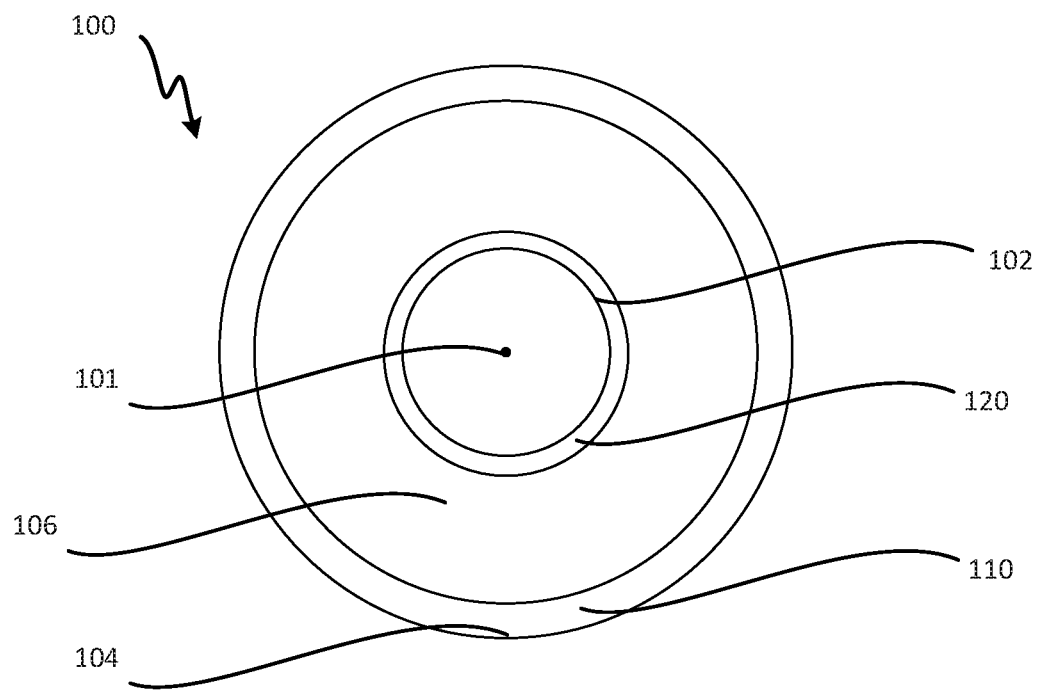
FIGS. 2a and 2b illustrate a schematic view of a fibrous preform in accordance with various embodiments.

In various embodiments and with reference to FIG. 2a, a fibrous preform 100 may comprise a non-uniform needling profile in a radial direction from axis of rotation 101. In various embodiments, fibrous preform 100 may comprise an annulus oriented about axis of rotation 101. In various embodiments, fibrous preform 100 may have an inner diameter 102 and an outer diameter 104. In various embodiments, fibrous preform 100 may comprise a medial portion 106 disposed between inner diameter 102 and outer diameter 104. In various embodiments, fibrous preform 100 may further comprise at least one of an outer diameter portion 110 or an inner diameter portion 120. In various embodiments, outer diameter portion 110 may extend a first distance radially inward from outer diameter 104 towards axis of rotation 101. In various embodiments, inner diameter portion 120 may extend a second distance radially outward from inner diameter 102 away from axis of rotation 101. In various embodiments, medial portion 106 may be disposed concentrically between outer diameter portion 110 and inner diameter portion 120.

In various embodiments, medial portion 106 may comprise a first needling profile. In various embodiments, the first needling profile may be optimized for performance as a wear surface of the brake disk. In various embodiments, the first needling profile may comprise a needling density of between about 40 penetrations per square centimeter to about 80 penetrations per square centimeter (wherein about means +/−10 penetrations per square centimeter). In various embodiments, the first needling profile may comprise a needling density of between about 50 penetrations per square centimeter to about 70 penetrations per square centimeter (wherein about means +/−10 penetrations per square centimeter). However, in various embodiments, the first needling profile may comprise any needling density suitable for use in a fibrous preform and/or brake disk.

In various embodiments, at least one of outer diameter portion 110 or inner diameter portion 120 may comprise a second needling profile. In various embodiments and with reference to FIGS. 2 and 3, the second needling profile may be optimized for performance as at least one of a rotor lug 212 or a stator lug 322 of the brake disk. In various embodiments and with reference to FIG. 3, a brake disk 200 may comprise a rotor lug 212 disposed on an outer diameter of the brake disk 200. In various embodiments, the rotor lug 212 may comprise the second needling profile. In various embodiments and with reference to FIG. 4, a brake disk 300 may comprise a stator lug 322 disposed on an inner diameter of the brake disk 300. In various embodiments, the stator lug 322 may comprise the second needling profile.

In various embodiments and with reference again to FIGS. 2 and 3, rotor lug 212 and/or stator lug 322 may receive load from other portions of a wheel and brake assembly. In various embodiments, the second needling profile may be optimized to increase the mechanical strength of rotor lug 212 and/or stator lug 322. In various embodiments, the second needling profile may be optimized to decrease and/or minimize the occurrence of shearing, cracking, chipping, and/or wear damage to the rotor lug 212 and/or the stator lug 322.

In various embodiments, the second needling profile may comprise a needling density of between about 80 penetrations per square centimeter to about 110 penetrations per square centimeter (wherein about means +/−10 penetrations per square centimeter). In various embodiments, the second needling profile may comprise a needling density of between about 90 penetrations per square centimeter to about 100 penetrations per square centimeter (wherein about means +/−10 penetrations per square centimeter). In various embodiments, the second needling profile may be greater than the first needling profile. In various embodiments, the second needling profile may be about 25% to 50% greater than the first needling profile (wherein about means +/−10%). In various embodiments, the second needling profile may be equal to at least a portion of the first needling profile. However, in various embodiments, the second needling profile may comprise any needling density suitable for use in a fibrous preform and/or brake disk.

Figure 2B:
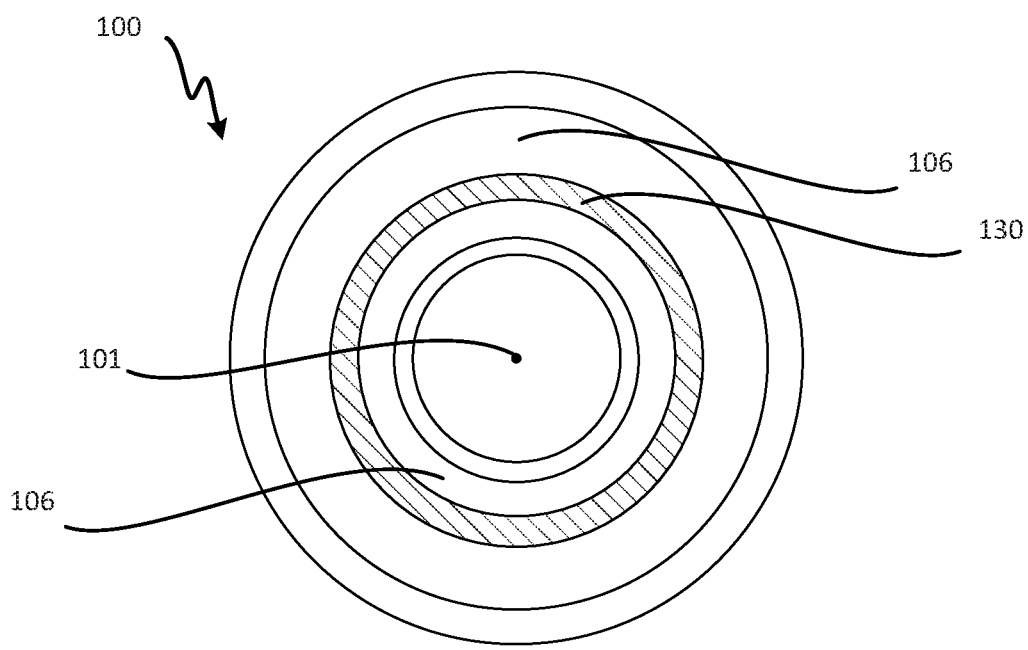
Figure 3:
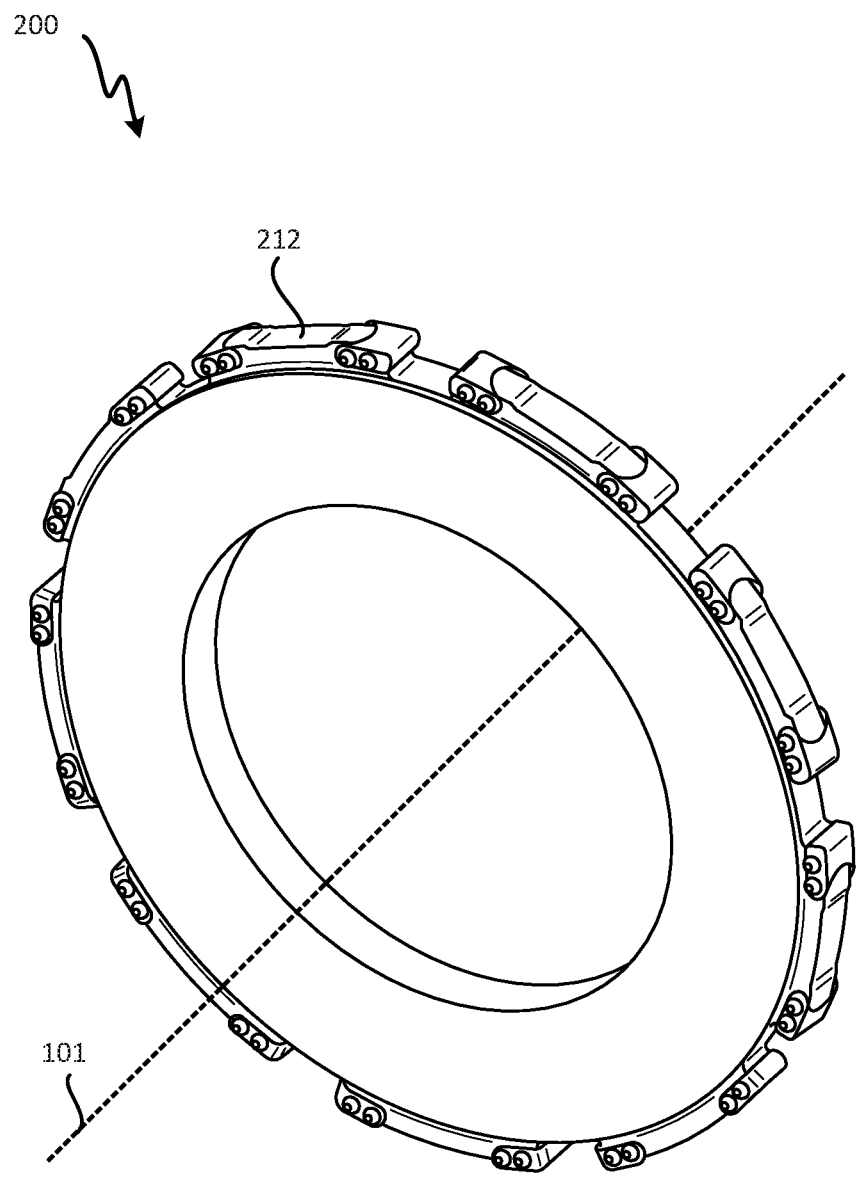
FIG. 3 illustrates a perspective view of an aircraft rotor brake disk in accordance with various embodiments.

In various embodiments, and with reference to FIGS. 2a and 2b, fibrous preform 100 may further comprise a heat affected zone 130. In various embodiments, heat affected zone 130 may be disposed on medial portion 106. In various embodiments, heat affected zone 130 may comprise a portion of fibrous preform 100 that may expand in response to localized heat and pressure during performance of the brake disk. In various embodiments, heat affected zone 130 may expand in response to a rejected take off of an aircraft. However, in various embodiments, heat affected zone 130 may not expand in response to performance of the brake disk.

In various embodiments, expansion of heat affected zone 130 may reduce contact area between adjacent brake disks of a wheel and brake assembly. In various embodiments, heat affected zone 130 may comprise a third needling profile optimized to increase a rate of wear of heat affected zone 130 so as to increase contact area between adjacent brake disks of a wheel and brake assembly during performance of the brake disk. In various embodiments, heat affected zone 130 may comprise the third needling profile optimized to increase heat conductivity. In various embodiments, heat affected zone 130 may comprise the third needling profile optimized for performance in response to a rejected take off of an aircraft.

In various embodiments, the third needling profile may comprise up to about 25 penetrations per square centimeter (wherein about means +/−10 penetrations per square centimeter). In various embodiments, the third needling profile may comprise no needling. In various embodiments, the third needling profile may be less than the first needling profile. In various embodiments, the third needling profile may be between about 25% (wherein about means +/−5%) and about 50% (wherein about means +/−5%) less than the first needling profile.

Figure 4:
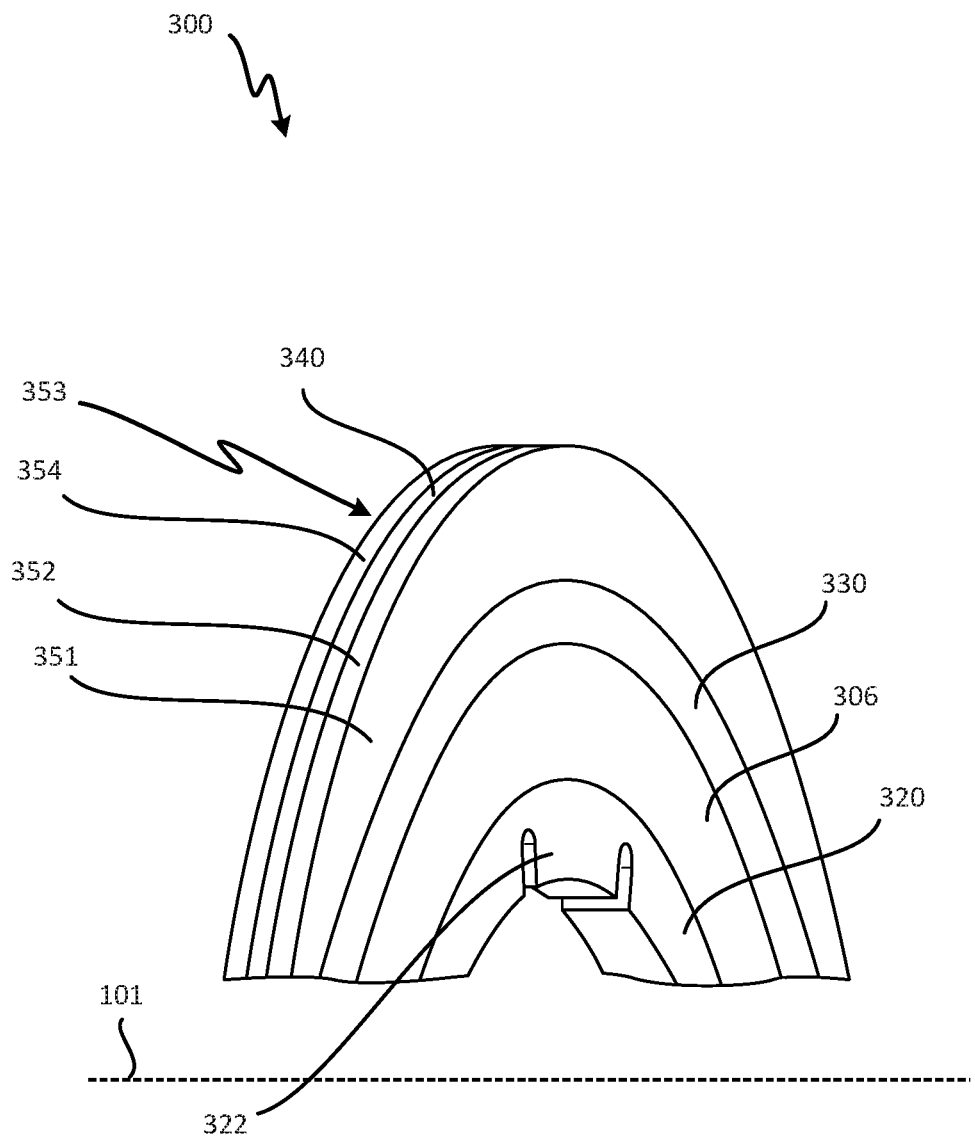
FIG. 4 illustrates a partial perspective view of an aircraft stator brake disk in accordance with various embodiments.

In various embodiments and with reference to FIG. 4, a brake disk 300 may comprise a non-uniform needling profile in an axial direction along axis of rotation 101. In various embodiments, brake disk 300 may comprise a first planar face 351 disposed on a first axial end of brake disk 300 and a second planar face 353 disposed on a second axial end of brake disk 300. In various embodiments, first planar face 351 and second planar face 353 may be disposed on opposite axial ends of brake disk 300. In various embodiments, brake disk 300 may further comprise a first planar portion 352 disposed adjacent to a first planar face 351, and a second planar portion 354 disposed adjacent to a second planar face 353.

In various embodiments, first planar portion 352 and/or second planar portion 354 may comprise at least one of a first needling profile 306, a second needling profile 320, or a third needling profile 330. In various embodiments and with momentary reference to FIGS. 2 and 3, first planar portion 352 and/or second planar portion 354 may comprise at least one of a rotor lug 212 or a stator lug 322.

In various embodiments, brake disk 300 may further comprise an inner portion 340 disposed between first planar portion 352 and second planar portion 354. In various embodiments, inner portion 340 may comprise a fourth needling profile optimized for densification. In various embodiments, the fourth needling profile may comprise a needling density of between about 80 penetrations per square centimeter to about 110 penetrations per square centimeter (wherein about means +/−10 penetrations per square centimeter). In various embodiments, the fourth needling profile may comprise a needling density of between about 90 penetrations per square centimeter to about 100 penetrations per square centimeter (wherein about means +/−10 penetrations per square centimeter). In various embodiments, the fourth needling profile may be greater than the first needling profile. In various embodiments, the fourth needling profile may be about 25% to 50% greater than the first needling profile (wherein about means +/−10%). In various embodiments, the fourth needling profile may be equal to at least a portion of the first needling profile. However, in various embodiments, the fourth needling profile may comprise any needling density suitable for use in a fibrous preform and/or brake disk.

Figure 5:
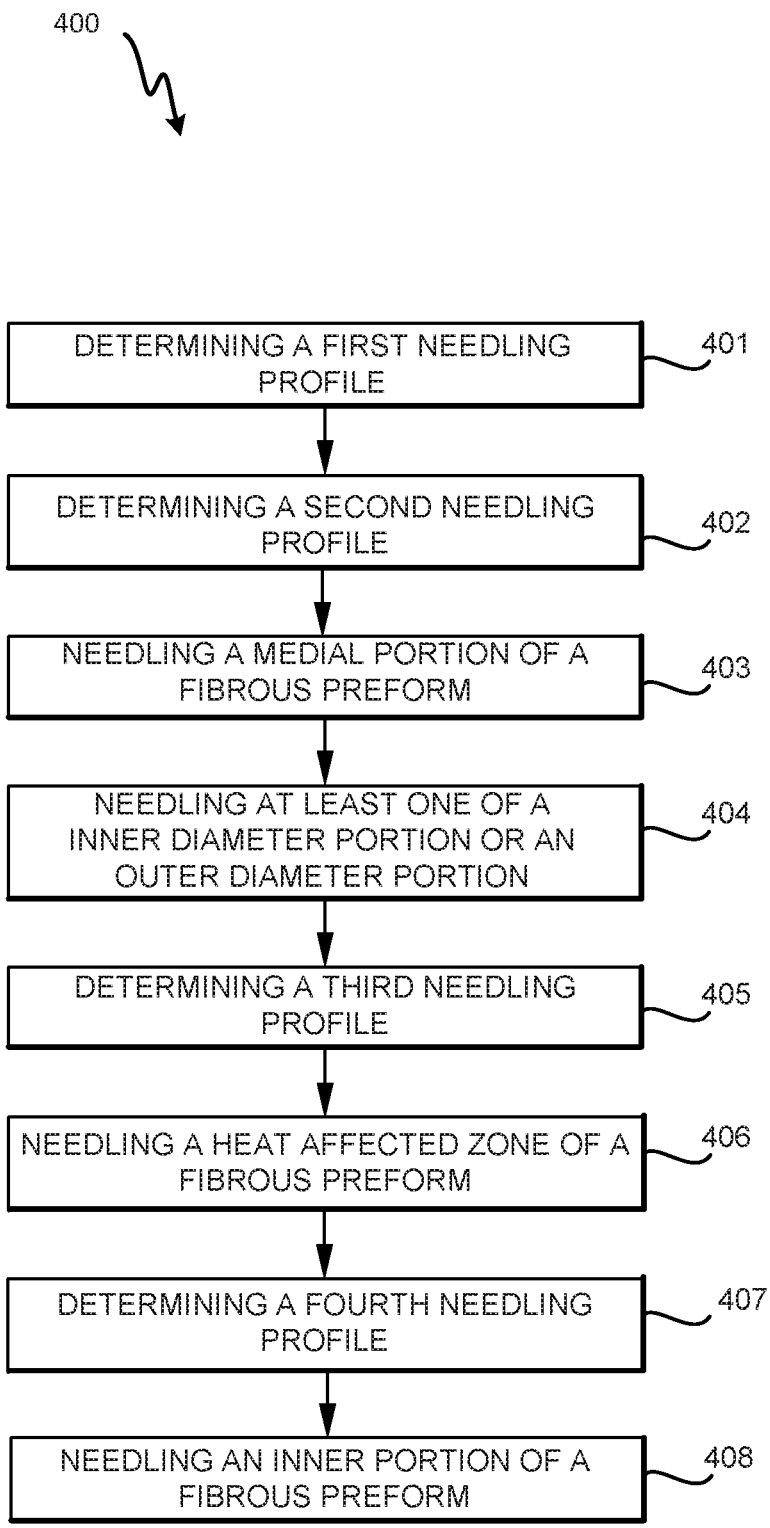
FIG. 5 illustrates a method of making a fibrous preform in accordance with various embodiments.

In various embodiments and with reference to FIG. 5, a method 400 of making an optimized fibrous preform comprises determining a first needling profile to optimize a first performance characteristic (Step 401) and determining a second needling profile to optimize a second performance characteristic (Step 402). In various embodiments, method 400 may further comprise needling a preform to achieve a non-uniform needling profile in the radial direction. In various embodiments, the needling the preform may comprise needling a medial portion of a preform to achieve the first needling profile (Step 403). In various embodiments, the needling the preform may further comprise needling at least one of an inner diameter portion or an outer diameter portion of a preform to achieve the second needling profile (Step 404).

In various embodiments, method 400 may further comprise determining a third needling profile to optimize a third performance characteristic (Step 405). In various embodiments, the needling the preform may comprise needling a heat affected zone disposed in the medial portion to achieve a third needling profile (Step 406).

In various embodiments, method 400 may further comprise determining a fourth needling profile to optimize a fourth performance characteristic (Step 407). In various embodiments, method 400 may further comprise needling a preform to achieve a non-uniform needling profile in the axial direction. In various embodiments, the needling the preform may further comprise needling an inner portion of the preform to achieve the fourth needling profile (Step 408).

In various embodiments, method 400 may be performed separately on each individual layer of the fibrous preform. In various embodiments, method 400 may be performed serially as layers of the fibrous preform are stacked. In various embodiments, method 400 may be performed on a linear loom. In various embodiments, method 400 may be performed on a circular needle loom. As used herein, a "loom" may refer to any weaving device.

Figure 6A:
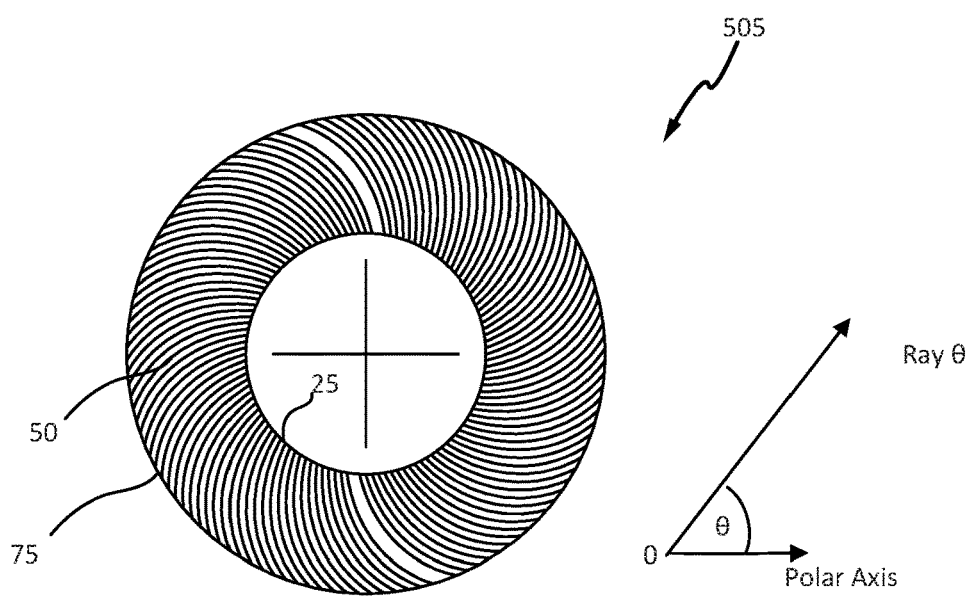
FIGS. 6a and 6b illustrate a schematic view of a fibrous preform in accordance with various embodiments.
Figure 6B:
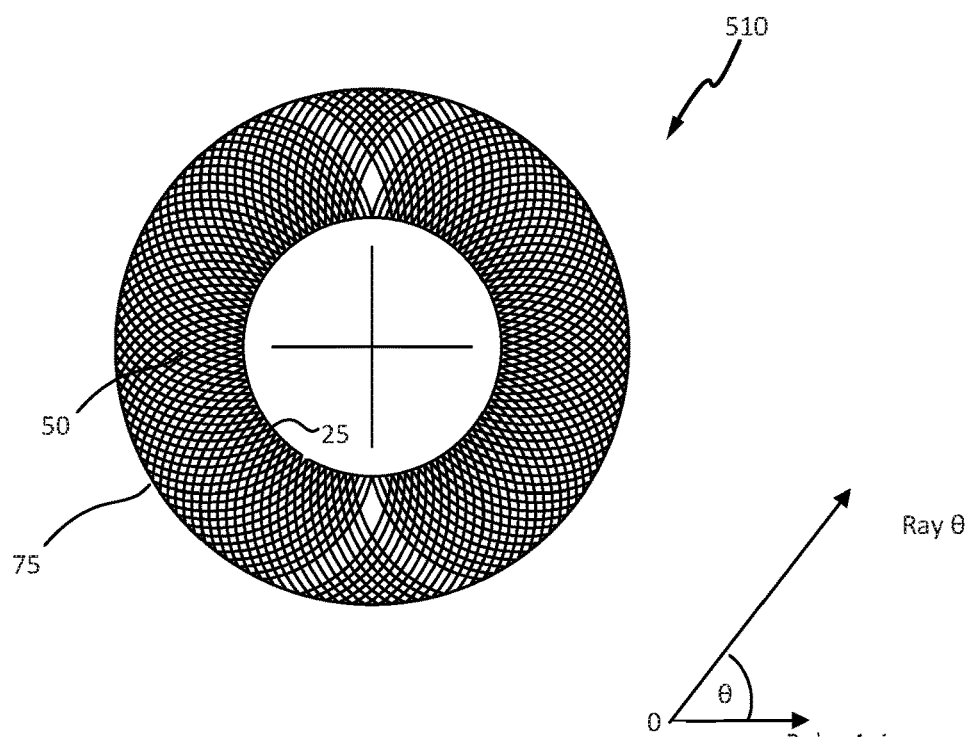

In various embodiments and with reference to FIGS. 5, 6a, and 6b, method 400 may be performed on each fiber tow length of a plurality of fiber tow lengths of the fibrous preform. As used herein, the term fiber tow length is used to refer to one or more strands of substantially continuous filaments. Thus, a "tow" may refer to a plurality of strands of substantially continuous filaments or a single strand of substantially continuous filament.

In various embodiments, method 400 may be performed as a fibrous preform is created through the additive addition of individual fiber tow lengths in each layer of the fibrous preform. In various embodiments and with reference to FIG. 6a, a fibrous preform layer 505 comprises the fiber tow angle of a fiber tow length 50 varying from inner diameter 25 to outer diameter 75 in a preform uni-directional layer. In various embodiments, the fiber tow length angle may vary, from more radial, such as at inner diameter, to more tangential, such as at the outer diameter, as the radius increases, such that there is substantially uniform thickness and substantially uniform areal weight from inner diameter to outer diameter of the fibrous preform. In various embodiments, a first angle of orientation may be measured at inner diameter 25 and may be repeated in a circular progression around the inner diameter. In various embodiments, a second angle of orientation measured at an outer diameter 75 of the fibrous preform and may be repeated in a circular progression around an exterior circumference of the fibrous preform.

In various embodiments, the fiber tow lengths of the first layer may each angle towards the clockwise direction and the fiber tow lengths of the next layer may be angled towards the counterclockwise direction. In various embodiments and with reference to FIG. 6b, a fibrous preform 510 comprises the fiber tow angle of lengths of fiber tow 50 in a fabric, varying from inner diameter 25 to outer diameter 75 in a fibrous preform for substantially uniform areal weight and thickness is depicted. In various embodiments, a substantially continuous fiber tow may be used to form the fibrous preform.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fibrous preform for an aircraft brake, comprising:
two or more layers of oxidized polyacrylonitrile fiber (OPF) materials;
an annulus formed from the two or more layers of OPF materials and having at least one of an outer diameter portion or an inner diameter portion, the outer diameter portion extending radially inward from an outer diameter of the fibrous preform and the inner diameter portion extending radially outward from an inner diameter of the fibrous preform; and
a medial diameter portion disposed between the outer diameter and the inner diameter,
wherein the medial diameter portion comprises a first needling profile, and the outer diameter portion comprises a second needling profile,
wherein the first needling profile and the second needling profile are co-planar,
wherein the second needling profile is about 25% to 50% greater than the first needling profile,
wherein first fiber tow lengths on a first layer of the OPF materials are angled in a first direction,
wherein the inner diameter portion comprises the second needling profile, and
wherein second fiber tow lengths on a second layer adjacent the first layer of the OPF materials are angled in a second direction opposing the first direction.

2. The fibrous preform of claim 1, further comprising a heat affected zone disposed in the medial diameter portion, the heat affected zone configured to expand in response to an increase in temperature following a rejected take off.

3. The fibrous preform of claim 2, wherein the heat affected zone comprises a third needling profile, the third needling profile being about 25% to 50% less than the first needling profile, wherein the third needling profile and the second needling profile are co-planar.

4. The fibrous preform of claim 3, further comprising:
an inner portion disposed between a first planar portion comprising the first needling profile, the second needling profile, and the third needling profile and a second planar portion comprising the first needling profile, the second needling profile, and the third needling profile, the first planar portion being disposed at a first axial end of the fibrous preform and adjacent to a first planar face of the fibrous preform and the second planar portion being disposed at a second axial end of the fibrous preform and adjacent to a second planar face of the fibrous preform;
wherein the inner portion comprises a fourth needling profile, the fourth needling profile being about 25% to 50% greater than the first needling profile.

5. A fibrous preform for an aircraft brake, comprising:
two or more layers of oxidized polyacrylonitrile fiber (OPF) materials;
an annulus formed from the two or more layers of OPF materials and having at least one of an outer diameter portion or an inner diameter portion, the outer diameter portion extending radially inward from an outer diameter of the fibrous preform and the inner diameter portion extending radially outward from an inner diameter of the fibrous preform;
a medial diameter portion disposed between the outer diameter and the inner diameter,
wherein the medial diameter portion comprises a first needling profile, and the outer diameter portion comprises a second needling profile,
wherein the first needling profile and the second needling profile are co-planar,
wherein the second needling profile is about 25% to 50% greater than the first needling profile,
wherein first fiber tow lengths on a first layer of the OPF materials are angled in a first direction, and
wherein second fiber tow lengths on a second layer adjacent the first layer of the OPF materials are angled in a second direction opposing the first direction,
a heat affected zone disposed in the medial diameter portion, the heat affected zone configured to expand in response to an increase in temperature following a rejected take off,
wherein the heat affected zone comprises a third needling profile, the third needling profile being about 25% to 50% less than the first needling profile, wherein the third needling profile and the second needling profile are co-planar.

\* \* \* \* \*